United States Patent
Ratiff et al.

(10) Patent No.: US 7,132,648 B2
(45) Date of Patent: Nov. 7, 2006

(54) UNIFORM, NON-DISRUPTIVE, AND RADIOMETRICALLY ACCURATE CALIBRATION OF INFRARED FOCAL PLANE ARRAYS USING GLOBAL SCENE MOTION

(75) Inventors: Bradley M. Ratiff, Rio Rancho, NM (US); Majeed M. Hayat, Albuquerque, NM (US); J. Scott Tyo, Edgewood, NM (US); Theodore S. Turner, Jr., Tucson, AZ (US)

(73) Assignee: Science & Technology Corporation@UNM, Albuquerque, NM (US)

( * ) Notice: Subject to any disclaimer, the term of this patent is extended or adjusted under 35 U.S.C. 154(b) by 0 days.

(21) Appl. No.: 10/824,285

(22) Filed: Apr. 14, 2004

(65) Prior Publication Data

US 2004/0206898 A1    Oct. 21, 2004

Related U.S. Application Data

(60) Provisional application No. 60/463,090, filed on Apr. 15, 2003.

(51) Int. Cl.
*G01D 18/00* (2006.01)
(52) U.S. Cl. .................................. 250/252.1
(58) Field of Classification Search .......... 250/252.1, 250/332
See application file for complete search history.

(56) References Cited

U.S. PATENT DOCUMENTS

| | | | |
|---|---|---|---|
| 4,298,887 A | 11/1981 | Rode | |
| 4,771,267 A | 9/1988 | Russell, Jr. et al. | |
| 5,023,459 A | 6/1991 | Osborn et al. | |
| 5,129,595 A | 7/1992 | Thiede et al. | |
| 5,276,319 A | 1/1994 | Hepfer et al. | |
| 5,449,907 A | 9/1995 | McKeeman et al. | |
| 5,619,426 A | 4/1997 | Hutchens et al. | |
| 5,631,466 A | 5/1997 | Botti et al. | |
| 5,693,940 A | 12/1997 | Botti et al. | |
| 5,705,811 A * | 1/1998 | Harder et al. | 250/232 |
| 5,717,208 A | 2/1998 | Woolaway, II | |
| 5,756,999 A | 5/1998 | Parrish et al. | |
| 5,811,808 A * | 9/1998 | Cannata et al. | 250/332 |
| 5,866,900 A * | 2/1999 | Jacobson et al. | 250/252.1 |
| 5,886,834 A * | 3/1999 | Harder et al. | 359/724 |
| 5,960,097 A | 9/1999 | Pfeiffer et al. | |
| 6,028,309 A * | 2/2000 | Parrish et al. | 250/332 |
| 6,211,515 B1 | 4/2001 | Chen et al. | |
| 6,215,115 B1 | 4/2001 | Baker et al. | |
| 6,232,614 B1 * | 5/2001 | Christy et al. | 250/504 R |

(Continued)

OTHER PUBLICATIONS

"Future of PMTs, vol. 3", http://sales.hamamatsu.com/assets/applications/ETD/PMt_Future_vol3.pdf, Hamamatsu Photonics K.K., (Jul. 2001),1-11.

(Continued)

*Primary Examiner*—David Porta
*Assistant Examiner*—Marcus Taningco
(74) *Attorney, Agent, or Firm*—Schwegman, Lundberg, Woessner & Kluth, P.A.

(57) ABSTRACT

A method of generating an image sequence that includes the steps of detecting scene irradiance using detectors in a focal plane array, generating an output image sequence for each of the detectors based on the detected irradiance, and correcting the output image sequence generated by a first subset of detectors in the focal plane array and the output image sequence generated by a second subset of detectors in the focal plane array using the correction provided to the first subset of detectors.

35 Claims, 6 Drawing Sheets

U.S. PATENT DOCUMENTS

| | | | |
|---|---|---|---|
| 6,243,498 B1 | 6/2001 | Chen et al. | |
| 6,255,650 B1 | 7/2001 | Warner et al. | |
| 6,330,371 B1 | 12/2001 | Chen et al. | |
| 6,465,785 B1 | 10/2002 | McManus | |
| 6,521,892 B1 | 2/2003 | Emanuel et al. | |
| 6,538,250 B1 | 3/2003 | McManus et al. | |
| 6,670,596 B1* | 12/2003 | Tsai et al. | 250/208.1 |
| 2003/0213910 A1* | 11/2003 | Anderson et al. | 250/338.1 |

OTHER PUBLICATIONS

Armstrong, E., et al., "Non-uniformity correction for improved registration and high-resolution image reconstruction in IR imagery", *Proceedings of SPIE—The International Society for Optical Engineering*, v 3808, (1999),150-161.

Barnes, T. H., "Photodiode array Fourier transform spectrometer with improved dynamic range", *Applied Optics*, 24(22), (Nov. 15, 1985),3702-6.

Basedow, R.W., et al., "HYDICE system: implementation and performance", *Proceedings of the SPIE—The International Society for Optical Engineering*, 2480, (1995),258-267.

Bell, W. R., et al., "Multispectral Thermal Imager-overview", *Proceedings of the SPIE—The International Society for Optical Engineering*, v 4381, (2001),173-83.

Borovytsky, V. N., et al., "Nonuniformity correction in infrared imaging systems", *Proceedings of the SPIE—The International Society for Optical Engineering*, v 4148, (2000),273-8.

Breiter, R. , et al., "High-performance nonuniformity correction hard- and software for FPA modules at AIM", *Proceedings of the SPIE—The International Society for Optical Engineering*, v 3698, (1999),799-806.

Cain, S. C., et al., "Improved atmospheric turbulence tilt-estimation through the use of a temporal transition model", *To be submitted to J. Optical Soc. Am. A.*, (2002),1-37.

Cain, S. C., et al., "Projection-based image registration in the presence of fixed-pattern noise", *IEEE Transactions on Image Processing*, 10(12), (Dec. 2001),1860-72.

Chiang, Yu-Ming , et al., "Analog integrated circuit for continuous-time gain and offset calibration of sensor arrays", *Analog Integrated Circuits and Signal Processing*, 12(3), (Apr. 1997),231-238.

Decker, M. L., et al., "Multispectral thermal imager (MTI) satellite hardware status, tasking and operations", *Proceedings of SPIE—The International Society for Optical Engineering*, v 4381, (2001),184-194.

Fried, D. L., "Optical resolution through randomly inhomogeneous medium for very long and very short exposures", *Optical Society of America—Journal*, 56(10), (Oct. 1966),1372-1379.

Gunapala, S. D., et al., "10-16 mu m broadband 640*512 GaAs/AlGaAs quantum well infrared photodetector (QWIP) focal plane array", *Proceedings of the SPIE—The International Society for Optical Engineering*, v 4369, (2001),516-23.

Harder, James A., "Passive scene based non-uniformity correction in scanning forward looking infrared sensors", *Proceedings of SPIE—The International Society for Optical Engineering*, v 3787, (1999),220-227.

Hardie, R. C., et al., "High-resolution image reconstruction from a sequence of rotated and translated frames and its application to an infrared imaging system", *Optical Engineering*, 37(1), (Jan. 1998),247-60.

Hardie, R. C., et al., "Scene-based nonuniformity correction with video sequences and registration", *Applied Optics*, 39(8), (Mar. 10, 2000),1241-50.

Harris, J. G., et al., "An analog implementation of the constant statistics constraint for sensor calibration", *Advances in Neural Information Processing Systems 9. Proceedings of the 1996 Conference*, (1997),699-705.

Harris, J. M., et al., "Continuous-time calibration of VLSI sensors for gain and offset variations", *Proceedings of the SPIE—The International Society for Optical Engineering*, v 2474, (1995),23-33.

Harris, J. G., "Minimizing the "ghosting" artifact in scene-based nonuniformity correction", *Proceedings of the SPIE—The International Society for Optical Engineering*, v 3377, (1998),106-13.

Harris, J. G., et al., "Nonuniformity correction using the constant-statistics constraint: analog and digital implementations [for IR FPA]", *Proceedings of the SPIE—The International Society for Optical Engineering* , v 3061, (1997),895-905.

Hayat, M. M., et al., "Boundary effects on multiplication noise in thin heterostructure avalanche photodiodes: Theory and experiment", *IEEE Transactions on Electron Devices*, 49(12), (Dec. 2002),2114-2123.

Hayat, M. M., et al., "Breakdown probabilities for thin heterostructure avalanche photodiodes", *IEEE Journal of Quantum Electronics*, 39(1), (Jan. 2003),179-85.

Hayat, M. M., et al., "Gain-bandwidth characteristics of thin avalanche photodiodes", *IEEE Transactions on Electron Devices*, 49(5), (May 2002),770-781.

Hayat, M. M., et al., "Model-based real-time nonuniformity correction in focal plane array detectors", *Proceedings of SPIE—The International Society for Optical Engineering*, v 3377, (1998),122-132.

Hayat, M. M., et al., "Statistical algorithm for nonuniformity correction in focal-plane arrays", *Applied Optics*, 38(5), (Feb. 10, 1999),772-80.

Hayat, M. M., et al., "Theory of impact ionization in thin multiplication layers", *LEOS 2001. 14th Annual Meeting of the IEEE Lasers and Electro-Optics Society*, 2(2), (2001),695-6.

Helfrich, R. W., "Programmable compensation technique for staring arrays", *Proceedings of the Society of Photo-Optical Instrumentation Engineers*, vol. 178. Smart Sensors, (1979),110-21.

Irani, M. , et al., "Improving resolution by image registration", *CVGIP: Graphical Models and Image Processing*, 53(3), (May 1991),231-9.

Ji, June K., et al., "Nonuniformity correction scheme for an infrared camera including the background effect due to camera temperature variation", *Optical Engineering*, 39(4), (Apr. 2000),936-40.

Jiang, G. , et al., "Nonuniformity correction of infrared image based on scene-matching", *Proceedings of SPIE—The International Society for Optical Engineering*, v 4548, (2001),280-283.

Leonberger, F. J., "Rapid advances in commercial optoelectronic components and modules for DWDM systems", *Conference Proceedings—Lasers and Electro-Optics Society Annual Meeting-LEOS*, v. 1, (2000),5-6.

Milton, A. F., et al., "Influence of nonuniformity on infrared focal plane array performance", *Optical Engineering*, 24(5), (Sep.-Oct. 1985),855-62.

Mooney, J. M., et al., "Responsivity nonuniformity limited performance of infrared staring cameras", *Optical Engineering*, 28(11), (Nov. 1989),1151-61.

Narendra, P. M., "Reference-free nonuniformity compensation for IR imaging arrays", *Proceedings of the Society of Photo-Optical Instrumentation Engineers*, v 252, (1980),10-17.

Narendra, P. M., et al., "Shutterless fixed pattern noise correction for infrared imaging arrays", *Proceedings of the SPIE—The International Society for Optical Engineering*, v 282, (1981),44-51.

Nelson, M. D., et al., "General noise processes in hybrid infrared focal plane arrays", *Optical Engineering*, 30(11), (Nov. 1991),1682-700.

O'Neil, W. F., et al., "Dithered scan detector compensation", *Proceedings of the SPIE—The International Society for Optical Engineering*, v 2075, (1993),35-46.

Olson, E. M., et al., "Non-uniformity correction using a flood technique and 1:1 mapping", *Proceedings of SPIE—The International Society for Optical Engineering*, v 4366, (2001),501-509.

Otten, L. J., et al., "On board spectral imager data processor", *Proceedings of SPIE—The International Society for Optical Engineering*, v 3753, (1999),86-94.

Perry, D. L., et al., "Linear theory of nonuniformity correction in infrared staring sensors", *Optical Engineering*, 32(8), (Aug. 1993),1854-9.

Ratliff, B. M., et al., "Algebraic scene-based nonuniformity correction in focal-plane arrays", *Proceedings of the SPIE—The International Society for Optical Engineering*, v 4372, (2001),114-24.

Ratliff, B. M., et al., "An algebraic algorithm for nonuniformity correction in focal-plane arrays", *Journal of the Optical Society of America A (Optics, Image Science and Vision)*, 19(9), (Sep. 2002),1737-47.

Ratliff, B. M., et al., "On the performance of a radiometrically-calibrated nonuniformity", *6th World Multiconference of Systemics, Cybernetics and Informatics. Proceedings*, vol. 9, (2002),194-8.

Ratliff, B. M., et al., "Radiometrically accurate scene-based nonuniformity correction for array sensors", *J. Opt. Soc. Am. A*, 20(10), (Oct. 2003),1890-1899.

Ratliff, B. M., et al., "Radiometrically calibrated scene-based nonuniformity correction for infrared array sensors", *Proceedings of the SPIE—The International Society for Optical Engineering*, v 4820, (2003),359-67.

Saleh, M. A., et al., "Breakdown voltage in thin III-V avalanche photodiodes", *Applied Physics Letters*, 79(24), (Dec. 10, 2001),4037-9.

Saleh, M. A., et al., "Impact-ionization and noise characteristics of thin III-V avalanche photodiodes", *IEEE Transactions on Electron Devices*, 48(12), (Dec. 2001),2722-2731.

Saleh, B., et al., "Semiconductor Photon Detectors—Chapter 17", *Fundamentals of Photonics*, New York : Wiley,(1991).

Schulz, M., et al., "Nonuniformity correction and correctability of infrared focal plane arrays", *Infrared Physics & Technology*, 36(4), (Jun. 1995),763-77.

Scribner, D. A., et al., "Adaptive nonuniformity correction for IR focal plane arrays using neural networks", *Proceedings of the SPIE—The International Society for Optical Engineering*, v 1541, (1991),100-9.

Scribner, D. A., et al., "Adaptive retina-like preprocessing for imaging detector arrays", *1993 IEEE International Conference on Neural Networks*, vol. 3, (1993),1955-60.

Scribner, D. A., et al., "Infrared focal plane array technology", *Proceedings of the IEEE*, 79(1), (Jan. 1991),66-85.

Scribner, D. A., et al., "Nonuniformity correction for staring IR focal plane arrays using scene-based techniques", *Proceedings of SPIE—The International Society for Optical Engineering*, v 1308, (1990),224-233.

Simi, C., et al., "Night Vision Imaging Spectrometer (NVIS) calibration and configuration: Recent developments", *Proceedings of SPIE—The International Society for Optical Engineering*, v 4381, (2001),109-117.

Stanek, C., et al., "Considerations and algorithm development for scene-based nonuniformity correction (NUC) in dynamic infrared projectors", *Proceedings of the SPIE—The International Society for Optical Engineering*, v 3697, (1999),379-90.

Swierkowski, L., et al., "Search for optimal infrared projector nonuniformity correction procedures. II", *Proceedings of the SPIE—The International Society for Optical Engineering*, v 4027, (2000),214-25.

Swierkowski, L., et al., "Search for optimal infrared projector nonuniformity correction procedures. III", *Proceedings of the SPIE—The International Society for Optical Engineering*, v 4366, (2001),453-64.

Torres, S. N., et al., "Kalman filtering for adaptive nonuniformity correction in infrared focal-plane arrays", *Journal of the Optical Society of America A (Optics, Image Science and Vision)*, 20(3), (Mar. 2003),470-80.

Torres, S. N., et al., "Kalman-filtering approach for non-uniformity correction in focal-plane array sensors", *Proceedings of SPIE—The International Society for Optical Engineering*, v 4030(2000),196-205.

Tribolet, P., et al., "High-performance infrared detectors at Sofradir", *Proceedings of the SPIE—The International Society for Optical Engineering*, 4028, (2000),438-56.

Tyo, J. S., et al., "Variable-retardance, Fourier-transform imaging spectropolarimeters for visible spectrum remote sensing", *Applied Optics*, 40(9), (Mar. 20, 2001),1450-1458.

Tzimopoulou, S., et al., "Scene based techniques for nonuniformity correction of infrared focal plane arrays", *Proceedings of the SPIE—The International Society for Optical Engineering*, 3436(1-2), (1998),172-83.

Vane, G., et al., "Airborne visible/infrared imaging spectrometer (AVIRIS)", *Remote Sensing of Environment*, 44(2-3), (May-Jun. 1993),127-143.

Vane, G., et al., "Terrestrial imaging spectroscopy", *Remote Sensing of Environment*, 24(1), (Feb. 1988),1-29.

Venkateswarlu, R., et al., "Nonuniformity compensation for IR focal plane array sensors", *Proceedings of the SPIE—The International Society for Optical Engineering*, v 3061, (1997),915-26.

Torres, S. N., et al., "On the performance analysis of a recent statistical algorithm for nonuniformity correction in focal-plane arrays", *Proceedings of the International Conference on Imaging Science, Systems, and Technology. CISST'2000*, 1(1), (2000),49-54.

* cited by examiner

UNIFORM, NON-DISRUPTIVE, AND RADIOMETRICALLY ACCURATE CALIBRATION OF INFRARED FOCAL PLANE ARRAYS USING GLOBAL SCENE MOTION

CROSS-REFERENCE TO RELATED APPLICATIONS

This application claims priority to the provisional U.S. patent application Ser. No. 60/463,090, to Ratliff et al., filed on Apr. 15, 2003, and titled "Uniform, Non-Disruptive, And Radiometrically Accurate Calibration Of Infrared Focal Plane Arrays Using Global Scene Motion," and incorporates its subject matter herein by reference in its entirety.

BACKGROUND OF THE INVENTION

1. Field of the Invention

The present invention relates to a field of optical imaging and spectral sensing. In particular, the present invention relates to non-disruptive continuous and radiometrically accurate calibration of a focal plane array sensor using a global scene motion.

2. Background Art

Advances in a solid state detector technology lead to an increasing use of focal plane array (FPA) detectors for infrared (IR) and visible-light imaging and spectral sensing. Use of FPAs allows compactness, cost-effective production and high performance of sensors, in turn, leading to high sensitivity and resolution. The IR-sensor arrays are applicable to broadband thermal imaging, where maximizing broadband spatial resolution and intensity signal-to-noise ratio is of paramount importance. Some of the examples of use of such FPAs include night-vision systems, airborne and space-based reconnaissance and surveillance systems, astronomical imaging, and forest fire early detection systems.

Other examples of use of such array sensors include spectral sensing. In spectral sensing, different array elements are designed to respond to different wavelengths of light. This allows the sensor to detect the spectrum of the source. Some of the modern day spectral sensors are capable of measuring irradiance at upwards of 200 narrow bands in every point in the image. Some examples of spectral sensors include detection and identification systems for hazardous biological and chemical agents, as well as monitoring systems of environmental changes in lakes and other natural habitats.

However, current technology relating to array-sensors have several drawbacks and disadvantages. One major disadvantage to using modern day array-sensors for quantitative remote sensing is the array's non-uniformity noise. Non-uniformity noise primarily results from minute detector-to-detector dissimilarities due to FPA's pixel-to-pixel variation in the response as well as fabrication related geometrical dissimilarities in individual FPA elements. It is well known, that most modern FPAs suffer from spatial non-uniformity noise. Spatial non-uniformity noise manifests itself in a form of a quasi-fixed pattern, also referred to as fixed-pattern noise ("FPN"). Non-uniformity noise can lead to an inaccurate radiometric measurement, reduced temperature resolvability, and reduced spatial resolution. Furthermore, it has a detrimental effect on the performance of many post-processing enhancement and restoration algorithms that assume temporal noise but not FPN, whose temporal statistics exhibit a high degree of correlation.

Some modern-day array-sensors developed systems for compensation of the non-uniformity noise through an one-time factory calibration of the sensor. However, such systems do not compensate for sensor drift problems over time, thus, making the one time factory calibration ineffective. To correct for sensor drift over time, a constant calibration of the sensor is necessary to correct for non-uniformity in the detector response. However, present day calibration techniques disrupt operation of the array sensor during the calibration process. Furthermore, there are other problems associated with modern day FPA sensors.

Therefore, there is a need for a better focal plane array sensor capable of being continuously calibrated while still detecting images from the scene. Furthermore, there is a need for a focal plane array sensor capable of continuously correcting for non-uniformity drift.

Further features and advantages of the invention, as well as the structure and operation of various embodiments of the invention, are described in detail below with reference to the accompanying drawings. It is noted that the invention is not limited to the specific embodiment described herein. Such embodiments are presented herein for illustrative purposes only. Additional embodiments will be apparent to persons skilled in the relevant art(s) based on the teachings contained herein.

BRIEF SUMMARY OF THE INVENTION

The present invention relates to a field of optical imaging and spectral sensing. In particular, the present invention relates to a non-disruptive continuous and radiometrically accurate calibration of a focal plane array sensor using global scene motion.

In an embodiment, the present invention is a method for generating a calibrated image sequence of a scene using a focal plane array detector having a plurality of outer perimeter detectors, a plurality of inner detectors and a plurality of buffer detectors placed adjacent to the plurality of outer perimeter detectors and the plurality of inner detectors. To generate the calibrated image sequence of the scene, the method first redirects the field-of-view of the plurality of outer perimeter detectors away from the scene and towards a calibration source using an optical switch. Then, it calibrates outer perimeter detectors using the calibration source and again redirects the field-of-view of the plurality of outer perimeter detectors away from the calibration source and towards the scene using an optical switch. After calibrating the outer perimeter detectors, the non-uniformity correction ("NUC") algorithm collects a sequence of images of the scene for a particular period of time using the plurality of outer perimeter detectors, buffer detectors, and inner detectors. Readout signals for each detector in the plurality of outer perimeter detectors, buffer detectors, and inner detectors are generated, where the readout signals are expressed as follows:

$$y_n(i, j) = a_{n,s}(i, j) z_n(i, j) + b_n(i, j)$$

where $a_{n,s}(i, j)$ and $b_n(i, j)$ are gain and bias associated with an $ij^{th}$ detector at time n, respectively; $z_n(i, j)$ is a total average number of photons impinging on the $ij^{th}$ detector at time n.

Using the readout signals, the NUC algorithm computes bias correction for each detector in the focal plane array. Then, it generates a corrected image sequence using the collected sequence of images of the scene and bias correction. The NUC algorithm is repetitive, because calibration of detectors and collection of images is performed continuously throughout operation of the NUC algorithm.

Another embodiment of the present invention relates to an optical apparatus, having an imaging mechanism for generating a corrected image sequence of a scene using non-uniformity correction techniques described above. The optical apparatus includes a first off-axis parabolic mirror, a second off-axis parabolic mirror and a movable field stop, where the movable field stop is placed in an optical path between the first and the second off-axis parabolic mirrors. A light incident on the first off-axis parabolic mirror is reflected towards the second off-axis parabolic mirror via the movable field stop. The movable field stop acts as an optical switch and in this embodiment also acts as the calibration source. Light passing through the field stop travels towards the second off-axis parabolic mirror, which reflects it towards the imaging mechanism.

Yet another embodiment of the present invention relates to a method of generating an image sequence that includes detecting scene irradiance using detectors in a focal plane array, generating an output image sequence for each of the detectors based on the detected irradiance, and correcting the output image sequence generated by a first subset of detectors in the focal plane array and the output image sequence generated by a second subset of detectors in the focal plane array using the correction provided to the first subset of detectors.

Further features and advantages of the invention, as well as structure and operation of various embodiments of the invention, are disclosed in detail below will reference to the accompanying drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

1. Overview.
2. Focal Plane Array.
3. A Non-Uniformity Correction Algorithm for Generating a Corrected Image of a Scene.
4. Correction for non-uniform gain.
5. Optical System.
6. Conclusion.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

1. Overview.

In an embodiment, the present invention brings radiometric accuracy into a non-disruptive scene-based non-uniformity correction ("NUC") by continuously calibrating perimeter detectors within a focal plane array detector ("FPA"). It also relies on a particular image-sequence processing NUC algorithm to calibrate inner detectors of the FPA.

In an alternate embodiment, the present invention provides an optical system which allows for calibration of the perimeter detectors and generation of a corrected image.

Another embodiment of the present invention provides non-uniformity correction using a generalized bias-independent approach to correcting FPA detectors' generated scene images that does not require perimeter calibration.

2. Focal Plane Array.

Figure 1:
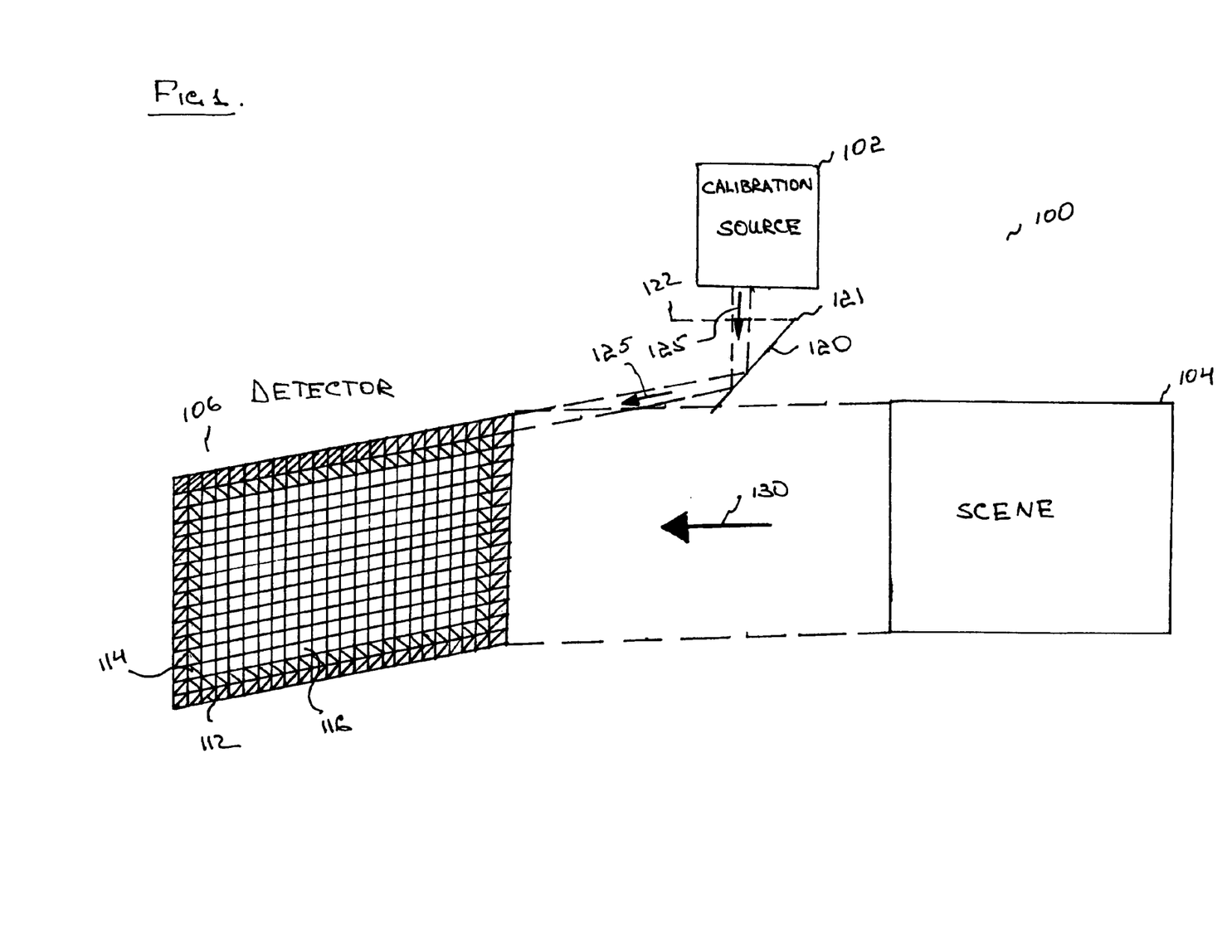
FIG. 1 illustrates a non-uniformity correction ("NUC") system showing a focal plane array sensor, according to the present invention.

FIG. 1 illustrates an embodiment of a non-uniformity correction ("NUC") system 100, according to the present invention. The NUC system 100 includes a scene 104, a focal plane array ("FPA") 106, a calibration source 102 and an optical switch 120. The FPA 106 is in an optical path between the calibration source 102 via the optical switch 120. The optical switch 120 is in an optical path between the FPA 106 and the calibration source 120.

FPA 106 includes a plurality of detectors 115 ($a, b, \ldots, m_0$), (referred to as detectors or pixels 115). Each detector 115 of FPA 106 is a light sensing element. Upon detection of irradiance from the scene 104, a detector 115 generates a readout signal in a form of a voltage associated with that irradiance. The strength of the readout signal depends on the level of irradiance received. For a particular detector 115, the detector's readout signal can be expressed as follows:

$$y_n(i, j) = a_{n,S}(i, j) z_n(i, j) + b_n(i, j) \qquad (1)$$

where $y_n(i, j)$ is the readout signal for a particular $ij^{th}$ detector 115 at time n; $a_{n,S}(i, j)$ and $b_n(i, j)$ are the gain and bias associated with the $ij^{th}$ detector at time n, respectively. The gain and bias depend on the frame time n and capture any possible temporal drift in their values. Further, the gain depends on the spectrum S of the irradiance source. The quantity $z_n(i, j)$ is the total average number of photons impinging on the $ij^{th}$ detector (integrated over the wavelengths supported by the detector) at time n. Further, the term $a_{n,S}(i, j)$ collectively represents the detector quantum efficiency over the spectrum S, the optical transmission (from the source to the ij$^{th}$ detector), the detector's active area and other optical and sensor-specific factors. The term b$_n$(i, j) represents the detector's bias and it also includes the contribution due to dark current. As seen from equation (1), gain's and bias's dependence on detector's position gives rise to non-uniformity noise. Furthermore, the detector's wavelength-dependent quantum efficiency, which is included in the gain term, gives the non-uniformity noise a spectral dependence, as well.

Detectors 115 include outer perimeter detectors 112(a, b, . . . , m$_1$) (referred to as outer perimeter detectors 112), secondary perimeter or buffer detectors 114(a, b, . . . , m$_2$) (referred to as secondary perimeter or buffer detectors 114), and inner detectors 116(a, b, . . . , m$_3$) (referred to as inner detectors 116). In the FIG. 1 embodiment, FPA 106 has a rectangular shape with detectors 115 forming rows (1, 2, . . . i . . . p) and columns (1, 2, . . . j . . . l). Therefore, each detector 115 is identified by a coordinate pair (i, j). Alternate embodiments of FPA 106 can include various shapes and sizes of FPA 106, which are application specific.

As shown in FIG. 1, outer perimeter detectors 112 occupy an outer edge of FPA 106. The outer perimeter detectors 112 form one or more rows along the outer edge of FPA 106. The buffer detectors 114 are parallel to the outer edge of FPA 106 and adjacent to the outer perimeter detectors 112 and the inner detectors 116. The buffer detectors 114 form at least one row in the FPA 106. The inner detectors 116 are part of the inner portion of FPA 106. Because each detector 115 is identified by the coordinate pair (i, j), each outer perimeter detector 112, buffer detector 114 and inner detector 116 is also identified by coordinate pair (i, j). As can be understood by one having ordinary skill in the relevant art, other arrangements of outer perimeter detectors 112, buffer detectors 114 and inner detectors 116 are possible. Also, the locations of the detectors are not limited to the FIG. 1 embodiment.

Calibration source 102 is optically coupled to FPA 106 via optical switch 120. Calibration source 102 serves as a source of calibration information for FPA 106. In an embodiment, calibration source 102 can be a temperature controlled blackbody source defined by the blackbody energy density function. In an alternate embodiment, calibration source 102 can be a two-point calibration system. As can be understood by one having ordinary skill in the relevant art, other calibration sources can be used depending on the desired accuracy of calibration.

Optical switch 120 optically separates calibration source 102 and FPA 106. In particular, optical switch 120 optically separates the calibration source 102 and the outer perimeter detectors 112 of FPA 106. Calibration source 102 supplies calibration information 125 to the outer perimeter detectors 112, when optical switch 120 is in an "on" position 121. This means that the field of view (FOV) of the outer perimeter detectors 112 is unobstructed towards the calibration source 102 but is blocked by the optical switch towards scene 104. Calibration information 125 is not supplied to the outer perimeter detectors 112 when calibration source 102 is blocked and optical switch 120 is in an "off" position 122. This means that the field of view of the outer perimeter detectors 112 is blocked by the optical switch 120 towards calibration source 102 and is unobstructed towards scene 104. In an embodiment, the optical switch 120 and the calibration source 102 can be incorporated into a single temperature controlled movable field stop. As can be understood by one having ordinary skill in the relevant art, optical switch 120 can be any optical element capable of changing the field of view of the outer perimeter detectors 112.

Scene 104 is any object that is desired to be imaged by the FPA 106. FPA 106 measures irradiance 130 directed from scene 104. Scene 104 can have various spectral and spatial irradiance patterns. For example, scene 104 can be sky, water, camouflage, or any other thermal media.

In this embodiment, NUC system 100 operates simultaneously in two cycles: the calibration cycle and the scene cycle. During the scene cycle, all of the detectors 115 have their field of view (FOV) directed towards scene 104. Therefore, each detector 115 generates a response signal based on an irradiance 130. The optical switch 120 is in the "off" position 122, which allows outer perimeter detectors 112 to view the scene 104.

During the calibration cycle, the optical switch 120 is in the "on" position 121 directing the field of view of the outer perimeter detectors 112 to the calibration source 102. The buffer detectors 114 and the inner detectors 116 have their field of view directed towards the scene 104 at all times. During the cycle, the calibration source 102 transfers calibration information to the outer perimeter detectors 112 to calibrate the detectors 112. Thus, the buffer detectors 114 and the inner detectors 112 are never blocked by the optical switch 120 during the calibration cycle or the scene cycle. The calibration source 102 transfers calibration information to outer perimeter detectors 112 using a conventional calibration technique, such as a blackbody source, or a two-temperature calibration system, or any other calibration system.

After outer perimeter detectors 112 are calibrated by the calibration source 102, the field of view of the outer perimeter detectors 112 is re-directed to the scene 104 by optical switch 120 and calibration information is transferred to buffer detectors 114 without interrupting the fields of view of the buffer detectors 114 or the inner detectors 116. Furthermore, while the calibration information is being transferred to buffer detectors 114, the calibration information is also being transferred to inner detectors 116 by buffer detectors 114. This is done without interrupting the fields of view of the inner detectors 116 or the buffer detectors 114. A non-uniformity correction algorithm, described with reference to FIGS. 2a–c and 3, allows transfer of calibration information among the FPA detectors. While the outer perimeter detectors 112 are being calibrated, the buffer detectors 14 continue to transfer the calibration information from the previous calibration cycle to the inner detectors 116.

3. A Non-Uniformity Correction Algorithm for Generating a Corrected Image of a Scene.

Figure 2A:
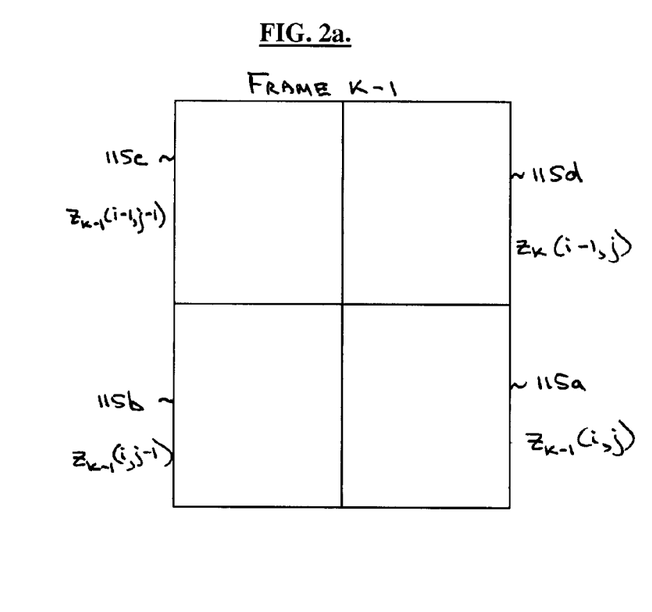
FIG. 2a illustrates an assembly of detectors in the focal plane array sensor before application of a non-uniformity correction ("NUC") algorithm, according to the present invention.
Figure 2B:
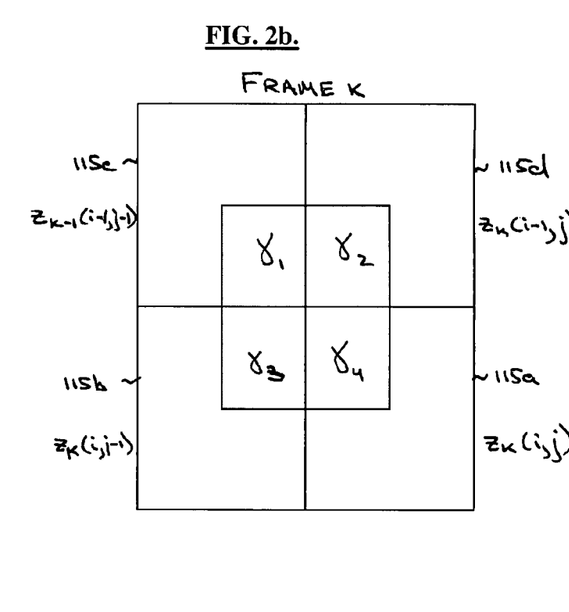
FIG. 2b illustrates focal plane array sensor's detectors of FIG. 2a during the application of the NUC algorithm, according to the present invention.
Figure 2C:
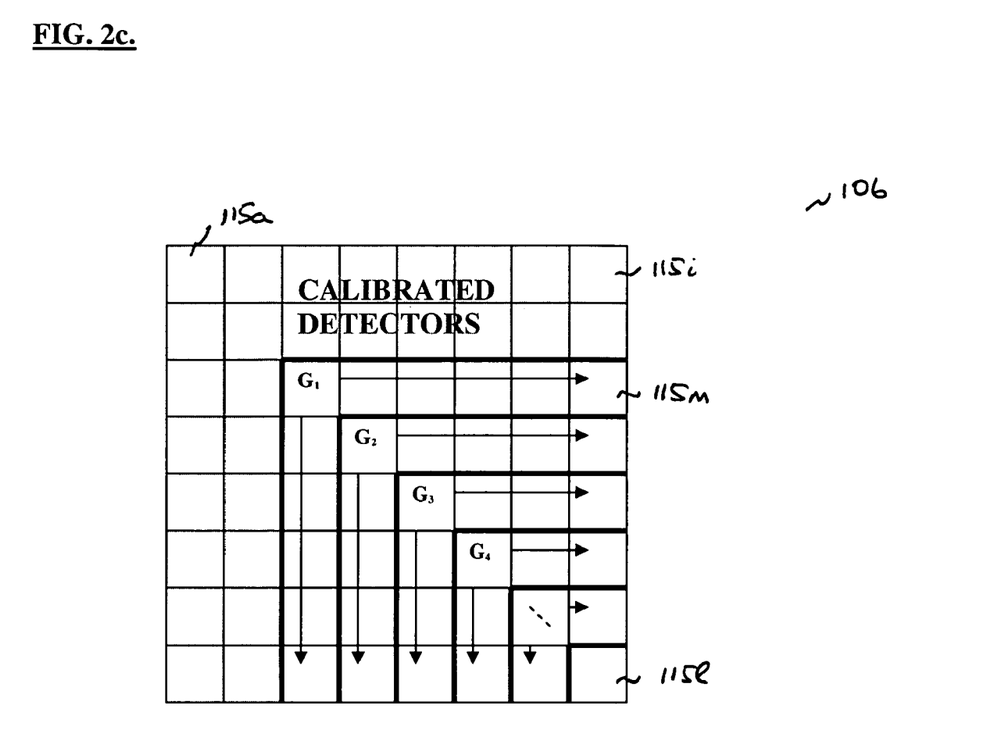
FIG. 2c illustrates a direction of the NUC algorithm's application to the focal plane array's detectors, according to the present invention.

FIGS. 2a–2c illustrate transfer of calibration information from calibrated detectors 115 to uncalibrated detectors 115 using the NUC algorithm. Referring to FIG. 2a, a portion of FPA 106 having four adjacent detectors 115(a, b, c, d) is shown. Detector 115a is identified by the coordinate pair (i, j). Detector 115b is identified by the coordinate pair (i, j−1). The other detectors are similarly identified using respective coordinate pairs, as shown in FIG. 2a. For the purposes of the following description, it is assumed that the detectors 115b, 115c, and 115d have already been calibrated. These detectors can be either outer perimeter detectors 112, buffer detectors 114, or inner detectors 116 that were calibrated either using the calibration source 102 (calibrating outer perimeter detectors 112) or the NUC algorithm (calibrating buffer detectors 114 and inner detectors 116). Using the NUC algorithm, the calibration information is transferred from calibrated detectors 115b, 115c, and 115d to uncalibrated detector 115a, thereby calibrating detector 115a, as shown in FIGS. 2a–b. During calibration process, the NUC algorithm uses detector readout information from all four detectors 115(a, b, c, d) to determine calibration needed for detector 115a.

FIG. 2a shows four detectors 115(a, b, c, d) at time (k−1) before transfer of calibration information from the calibrated detectors 115b, 115c, and 115d to the uncalibrated detector 115a. Calibrated detectors 115b, 115c, and 115d are identified by coordinate pairs (i, j−1), (i−1,j−1), and (i−1,j), respectively, and are shown in gray in FIG. 2a.

Referring to equation (1) above, because detectors 115b, 115c, and 115d were previously calibrated, their gains are equal to one ($a_{n,s}(i, j)=1$) and their biases are equal to zero ($b_n(i, j)=0$). The bias of the uncalibrated detector 115a is not equal to zero. Upon application of the NUC algorithm, the bias of detector 115a is adjusted to zero. In this embodiment, the gain of the uncalibrated detector 115a is equal to one. However, the present invention's NUC algorithm calibrates detector 115a even if its gain is not uniform. In an alternate embodiment described below, the present invention's NUC algorithm applies non-uniformity correction to detectors using an initial arbitrary unknown bias value, as opposed to initial zero bias value. The initial arbitrary bias value is independent of any parameters of the algorithm and the system employing the algorithm. There is no need to have any knowledge or control over this value. This allows application of the non-uniformity correction using the NUC algorithm without knowledge of initial bias values or any calibration parameters.

FIG. 2b shows transfer of the calibration information from calibrated detectors 115b, 115c, and 115d to the uncalibrated detector 115a. During the transfer of calibration information at time k, the field of view of the uncalibrated detector 115a will "straddle" the field of view of the four detectors 115(a, b, c, d) at time (k−1), due to scene motion. This is shown by gray portions $\gamma_1, \gamma_2, \gamma_3$, and $\gamma_4$ corresponding to detectors 115(a, b, c, d), respectively. In other words, at time k, the calibration information from calibrated detectors 115b, 115c, and 115d along with readout signals from detectors 115a, 115b, 115c, and 115d at times k and (k−1) is used to compute non-uniformity correction for detector 115a (described below). After completion of transfer of calibration information, all four detectors 115(a, b, c, d) are calibrated and can generate a uniform response to scene irradiance. The calibration process then proceeds to adjacent detectors 115 in the same manner as described above. This is further illustrated by FIG. 2c below.

Referring to FIG. 2c, the present invention is capable of transferring calibration information received from the calibration source 102 in various directions between detectors 115 within FPA 106 (for example, the rightward and downward directions). The calibration information is transferred from calibrated detectors 115 (shown in gray color) down to uncalibrated detectors 115 (shown in white color) through calibration of a particular detector group $G_1$ 115 and then transferring calibration information either in the downward or rightward manner to neighboring detectors 115 within detector group $G_1$. This, in turn, allows calibration of detector groups $G_2, G_3$, and other detectors 115 of FPA 106. However, as can be understood by one having ordinary skill in the relevant art, transfer of calibration information is possible in other directions at the same time, such as upward and leftward directions.

Figure 3:
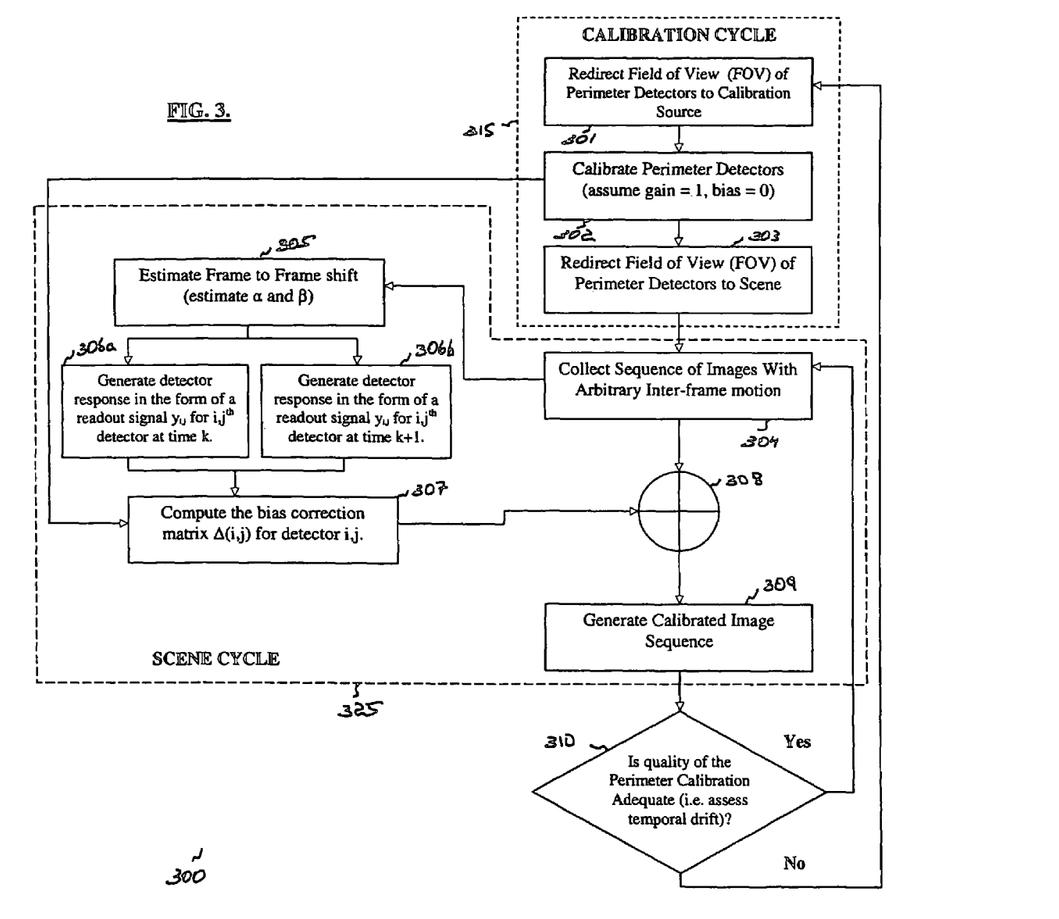
FIG. 3 is a flow chart illustrating steps of the NUC algorithm, according to the present invention.

FIG. 3 illustrates an embodiment of a NUC algorithm 300 for generating a non-uniformity correction to detectors 115 of FPA 106. The NUC algorithm 300 continuously calibrates detectors 115 to correct for non-uniformities in detectors' 115 responses to the irradiance 130. In the FIG. 3 embodiment, the NUC algorithm 300 simultaneously operates in two cycles: a calibration cycle 315 and a scene cycle 325, as shown in FIG. 3. As mentioned above, the NUC algorithm 300 continuously calibrates detectors 115 during calibration cycle 315 while applying calibration information to correct any non-uniformities in image sequences generated during scene cycle 325.

In an embodiment, the NUC algorithm 300 performs under an assumption that the gain term of a detector readout signal is one (i.e., $a_{n,s}(i, j)=1$). This means that the gain is uniform throughout the calibration and scene viewing cycles. However, the NUC algorithm 300 substantially eliminates non-uniformities from a detector received image even when the gain is not uniform.

Referring back to FIG. 3, in step 301 of the calibration cycle 315, the NUC system 100 (shown in FIG. 1) redirects the field of view of the outer perimeter detectors 112 towards the calibration source 102. This is accomplished by switching the optical switch 120 into the "on" position 121, as described above with reference to FIG. 1. With switch 120 in the "on" position, the calibration source calibrates the outer perimeter detectors 112. At the same time, the buffer detectors 114 and the inner detectors 116 simultaneously detect the scene irradiance 130 from scene 104. During this interval, the buffer detectors 114 transfer calibration information, received from an earlier calibration cycle, to the inner detectors 116.

In step 302, the outer perimeter detectors 112 are calibrated using calibration information transferred to outer perimeter detectors 112 from calibration source 102. During the calibration process, the bias term, $b_n(i, j)$, of the outer perimeter detectors 112 is equal to zero. Using the calibration information received by the outer perimeter detectors 112, the algorithm computes a bias correction matrix $\Delta(i, j)$. The bias correction matrix $\Delta(i, j)$ determines the non-uniformity correction for a particular detector 115 designated by (i, j).

Once the calibration of the outer perimeter detectors 112 is completed, the NUC system 100 redirects the field of view of outer perimeter detectors 112 away from the calibration source 102. This is accomplished by changing the optical switch 120 to an "off" position 122 and allowing the outer perimeter detectors 112 to view scene 104. This is shown in step 303 of the NUC algorithm 300.

The NUC algorithm 300 then begins scene cycle 325 by proceeding to step 304. Once the calibration information is transferred to outer perimeter detectors 112, the FPA 106 collects sequences of images using an arbitrary inter-frame motion. As would be understood by one having ordinary skill in the relevant art, other methods of collecting images from the scene using an FPA are possible.

For each pair of collected image frames, the FPA 106 estimates a frame-to-frame shift using conventional frame shift estimation techniques, as shown in step 305. The NUC algorithm 300, described by equations (2)–(10) below, applies to each pair of frames to correct for any non-uniformities associated with the image detection.

The processing then proceeds to steps 306a and 306b. In steps 306a and 306b, detectors generate readout signals $y_n(i, j)$, according to equation (1) above (where n=1, ..., k, where k is an integer). In step 306a, a readout signal $y_k(i, j)$ is generated for all i and j at time k. In step 306b, a readout signal $y_{k+1}(i, j)$ is generated for i and j at time k+1. The following equation represents the readout signal $y_k(i, j)$ for the $ij^{th}$ detector at time k:

$$y_k(i, j) = z_k(i, j) + b(i, j) \quad (2)$$

Assuming gain uniformity and a vertical calibration movement by a shift amount $\alpha$ (amount determined in step 305 as a frame-to-frame shift). The vertical calibration movement is a direction of calibration that starts from the top FPA detectors and then proceeds to the bottom FPA detectors—a one-dimensional motion. The following equation represents readout signal $y_{k+1}(i+1,j)$ for the $(i+1)j^{th}$ detector at time (k+1):

$$y_{k+1}(i+1, j) = \alpha z_k(i, j) + (1-\alpha) z_k(i+1, j) + b(i+1, j) \quad (3)$$

Using an one dimensional motion, the bias correction matrix $\Delta(i, j)$ is calculated in step 307 using the following equation:

$$\Delta(i+1, j) = y_k(i, j) - (1-\alpha^{-1}) y_k(i+1, j) - y_{k+1}(i+1, j) \quad (4)$$

which after simplification and canceling out of terms, equation (4) becomes:

$$\Delta(i+1, j) = b(i, j) - b(i+1, j) \quad (5)$$

The bias correction matrix $\Delta(i+1,j)$ is computed using the readout signals for detectors that are immediately adjacent to the detector for which the bias correction is being calculated. Further, the bias correction matrix $\Delta(i, j)$ is sequentially calculated for each detector in each column of the FPA starting with a first detector (for example, $(2, j)$) and moving downward. The bias correction matrix $\Delta(i, j)$ is computed for each pair of frames. The values of $\Delta(i, j)$ for each pair of frames can be combined to provide a more robust correction matrix. This combination can be performed, for example, by averaging the matrices for each pair of frames, though other methods are possible. Thus, the bias correction matrix is continuously updated using equation (5) as the NUC algorithm 300 proceeds from frame to frame. If calibration information (or readout signals) are known for $ij^{th}$ and $(i+1)j^{th}$ detectors at time k, the bias correction can be computed for $(i+1)j^{th}$ detector at time k+1 and beyond.

For example, if i=1 and j=1, then $$y_{k+1}(2,1) = \alpha z_k(1,1) + (1-\alpha) z_k(2,1) + b(2,1) \quad (6)$$

and $$y_k(1,1) = z_k(1,1) + b(1,1) \quad (7)$$

then the bias correction matrix $\Delta(2, 1)$ is computed using equations (3)–(5) as follows:

$$\Delta(2,1) = y_k(1,1) - (1-\alpha^{-1}) y_k(2,1) - y_{k+1}(2,1) = b(1,1) - b(2,1) \quad (8)$$

Therefore, if $\Delta(\mathbf{2, 1})$ is added to the $(\mathbf{2, 1})^{th}$ detector of any raw frame, the bias of this detector will be converted from $b(\mathbf{2, 1})$ to $b(\mathbf{1, 1})$. However, since the bias of detector $(\mathbf{1, 1})$ is equal to zero (detector $(\mathbf{1, 1})$ was calibrated in step 301 using a calibration source and, thus, its bias is zero), the bias of the $(\mathbf{1, 2})^{th}$ detector is now equal to zero, because of application of non-uniformity correction.

The one-dimensional calibration process is used when a top row of FPA detectors is already calibrated by the calibration source 102. However, multiple pairs of detectors at different times can be utilized and the same procedure can be repeated for each detector at each particular time. The following is a description of the utilization of the NUC algorithm 300 for an arbitrary application of non-uniformity correction to selected detectors 115 at various times k, without limiting such application to a one-dimensional motion.

Assuming that $\alpha$ and $\beta$ denote arbitrary vertical and horizontal directional frame shifts between detectors' responses to scene irradiance, respectively, between $k^{th}$ and $(k+1)^{th}$ time frames, as determined by step 305 of the NUC algorithm 300, then each shift is written as its whole-integer (denoted by "[ ]") plus its fractional part (denoted by "{ }"), i.e., $\alpha = [\alpha] + \{\alpha\}$ and $\beta = [\beta] + \{\beta\}$. Using the linear interpolation model described by equation (1) above, the bias correction matrix $\Delta$ is calculated for the $(i, j)^{th}$ detector at time (k+1) using values of its neighboring detectors (as shown in FIGS. 2a–2c):

$$\Delta(i, j) = \{\alpha\}\{\beta\} y_k(i - [\alpha] - 1, j - [\beta] - 1) + \quad (9)$$
$$(1 - \{\alpha\})\{\beta\} y_k(i - [\alpha], j - [\beta] - 1) +$$
$$\{\alpha\}(1 - \{\beta\}) y_k(i - [\alpha] - 1, j - [\beta]) +$$
$$(1 - \{\alpha\})(1 - \{\beta\}) y_k(i - [\alpha], j - [\beta]) - y_k(i, j)$$

After substituting appropriate values for $y_k(i, j)$ from equation (1), the following is a result for the bias correction matrix $\Delta(i, j)$:

$$\Delta(i, j) = \{\alpha\}\{\beta\} b(i - [\alpha] - 1, j - [\beta] - 1) + \quad (10)$$
$$(1 - \{\alpha\})\{\beta\} b(i - [\alpha], j - [\beta] - 1) +$$
$$\{\alpha\}(1 - \{\beta\}) b(i - [\alpha] - 1, j - [\beta]) +$$
$$(1 - \{\alpha\})(1 - \{\beta\}) b(i - [\alpha], j - [\beta]) - b(i, j)$$

Therefore, the top-most and left-most layers of detectors of the FPA 106 are already calibrated $[\alpha]+1$ and $[\beta]+1$ detectors "deep," respectively. All of the respective biases in equation (10) are forced to zero except for $b(i, j)$. The bias correction matrix $\Delta(i, j) = -b(i, j)$, which is the bias correction for the $(i, j)^{th}$ detector.

The NUC algorithm 300 calculates the bias correction matrix $\Delta(i, j)$ by proceeding in downward and rightward directions among the detectors in the focal plane array for each pair of frames. Once the bias correction matrix is computed for each pair of frames, the NUC algorithm 300 combines this correction matrix with those obtained from previous pairs of frames to compute a more robust correction matrix for the focal plane array. The global $\Delta$ can be computed using conventional methods, such as averaging all $\Delta(i, j)$'s or other methods. The global $\Delta$ serves as a correction to all of the detectors in the focal plane array.

Referring back to FIG. 3, after computing the bias correction matrix $\Delta(i, j)$, the NUC algorithm applies the bias correction matrix $\Delta(i, j)$ to the sequence of images collected in step 304. As described above, the bias correction matrix $\Delta(i, j)$ corrects the bias for each detector 115 of FPA 106 being calibrated and, thus, corrects any non-uniformities associated with a detector response to scene irradiance 130 generated by the FPA 106.

After each detector that had its field of view directed towards scene 104 is corrected using the bias correction matrix $\Delta(i, j)$, the NUC algorithm 300 generates a corrected image sequence in step 309. The corrected image sequence is a radiometrically accurate image of the scene 104. The accuracy of the image depends on a selected accuracy of the calibration source 102.

The processing then proceeds to step 310. In step 310, the NUC algorithm 300 determines whether the calibrated image sequence generated in step 309 is adequate. This step is performed through assessment of temporal drift within the detectors. If the calibrated image sequence is satisfactory, the processing proceeds to step 304 to gather new images of the scene 104.

However, if the calibrated image sequence is not satisfactory, further non-uniformity correction is desired. The NUC algorithm then proceeds back to step 301 to perform calibration of the outer perimeter detectors 112 and generate new calibrated image sequences. While the calibration cycle (including steps 301 through 303) is being performed, the buffer detectors 114 and inner detectors 116 continue to perform the scene cycle (steps 304 through 309).

Because NUC algorithm 300 continuously calibrates detectors 115 of FPA 106, steps 301 through 303 are repeated throughout the operation of the NUC algorithm 300. Moreover, the outer perimeter detectors 112 continuously receive calibration information from calibration source 102.

The above non-uniformity correction algorithm allows for calibration and imaging of an object using a model for an arbitrary two-dimensional motion. The algorithm also applies non-uniformity correction in circumstances where bias is equal to some arbitrary value b and without initial calibration of the FPA detectors' biases to zero. In this embodiment, the NUC algorithm 300 substantially involves a two-step approach to generating a corrected image. First step is directed to unifying bias values of the outer perimeter detectors to a single arbitrary and unknown bias value b. Second step is directed to applying non-uniformity correction techniques described above to other detectors using the above unknown bias value b. As stated above, the NUC algorithm 300 will apply non-uniformity correction regardless of the unknown value b. This method is advantageous for systems where absolute radiometry is not necessary and is applicable to all systems where a video sequence is available with global translational motion.

The NUC algorithm 300 unifies the bias values of all FPA detectors to an arbitrary bias value b of a chosen outer perimeter detector. Therefore, NUC algorithm applies to the outer perimeter FPA detectors to achieve an equal, arbitrary bias value b for these detectors. The perimeter elements are unified to the same unknown bias value b using techniques such as the one described in "An algebraic algorithm for nonuniformity correction in focal-plane arrays," by Ratliff, B. M., Hayat, M. M., Hardie, R. C., Journal of Optical Society of America, Vol. 19, No. 9, September 2002, pg. 1737–1747. Once all outer perimeter detectors have an equal bias value b, NUC algorithm 300 applies a two-dimensional model to equate bias values of all FPA detectors to the same value b of the outer perimeter detectors, as described above. This method substantially eliminates costly application of perimeter calibration when radiometric accuracy is of lesser concern.

Assuming that all outer perimeter detectors have bias values of b, the $ij^{th}$ detector's bias differential for an image pair with down-rightward two-dimensional motion is computed as follows (similarly to equations (9)–(10)):

$$\Delta(i, j) = \gamma_1 y_k(i-[\alpha]-1, j-[\beta]-1) + \gamma_2 y_k(i-[\alpha], j-[\beta]-1) + \gamma_3 y_k(i-[\alpha]-1, j-[\beta]) + \gamma_4 y_k(i-[\alpha], j-[\beta]) + y_{k+1}(i, j) \quad (11)$$

where y denotes detector outputs, $i=2+[\alpha], 3+[\alpha], \ldots, M$, $j=2+[\beta], 3+[\beta], \ldots, N$, M and N denote the size of an image. The vertical and horizontal shift components are denoted by $\alpha$ and $\beta$, respectively. These shifts can be written as an integer and fractional parts (as described above with respect to equations (9) and (10)): $\alpha=[\alpha]+\{\alpha\}$ and $\beta=[\beta]+\{\beta\}$, where [ ] denotes an integer part and { } denotes a fractional part. The $\gamma_i$ are fractional pixel factors that are defined as follows:

$\gamma_1 = |\{\alpha\}\{\beta\}|$;
$\gamma_2 = (1-|\{\alpha\}|)|\{\beta\}|$;
$\gamma_3 = |\{\alpha\}|(1-|\{\beta\}|)$;
$\gamma_4 = (1-|\{\alpha\}|)(1-|\{\beta\}|)$;

where $\gamma_1 + \gamma_2 + \gamma_3 + \gamma_4 = 1$. Because the outer perimeter detectors have been unified to have an unknown bias value of b, the top-leftmost non-unified detector (i.e., detector's bias is not equal to b) has a bias differential of the form (using equations (9)–(11)):

$$\Delta(2+[\alpha], 2+[\beta]) = \gamma_1 b + \gamma_2 b + \gamma_3 b + \gamma_4 b - b(2+[\alpha], 2+[\beta]) \quad (12)$$

because the sum of the terms $\gamma_i$ is equal to 1, equation (12) becomes:

$$\Delta(2+[\alpha], 2+[\beta]) = b - b(2+[\alpha], 2+[\beta]) \quad (13)$$

Because this bias differential is added to the top-leftmost non-unified detector, $y(2+[\alpha], 2+[\beta])$, its bias is subtracted and replaced with the bias value of b. This equates this detector's bias to the outer perimeter detectors' biases. Because this algorithm is applied recursively, the buffer detectors' 114 and the interior detectors' 116 bias differentials are computed as follows:

$$\Delta(i, j) = b - b(i, j) \quad (14)$$

After calculating the updated bias differentials for the FPA detectors, the bias values are arranged in a matrix form and are added to an arbitrary raw image for correction. Therefore, the generalization of NUC algorithm 300 accommodates large number of detectors. Further, use of the arbitrary bias value b allows for applying non-uniformity correction algorithms without use of the perimeter calibration, where all bias values of the outer perimeter detectors are calibrated to zero. FIG. 5d illustrates an image corrected by the above generalized algorithm.

In an alternative embodiment of the present invention, the NUC algorithm 300 substantially corrects both gain and bias non-uniformities independently of the calibration parameters. For simplification purposes, the description of NUC algorithm 300 is given for a two-dimensional sub-pixel motion. As would be understood by one having ordinary skill in the relevant art, the NUC algorithm 300 is not limited to the two-dimensional sub-pixel motion.

Therefore, assuming two-dimensional sub-pixel motion, i.e., $0<\alpha<1$ and $0<\beta<1$, where $\alpha$ and $\beta$ represent vertical and horizontal directional frame shifts between detectors' responses to scene irradiance, and that each detector has an arbitrary gain value, the following equation represents response by an $(i, j)^{th}$ detector to an irradiance $z_k(i, j)$ at time k, having a gain, $a(i, j)$, and a bias, $b(i, j)$:

$$y_k(i, j) = a(i, j) z_k(i, j) + b(i, j) \quad (15)$$

As described in equations (9)–(14), the bilinear interpolation model for the $(i, j)^{th}$ detector at time k+1, the detector model is now given by $$y_{k+1}(i, j) = a(i, j) \hat{z}_{k+1}(i, j) + b(i, j) \quad (16)$$

where $$\hat{z}_{k+1}(i, j) = \gamma_1 z_k(i-1, j-1) + \gamma_2 z_k(i-1, j) + \gamma_3 z_k(i, j-1) + \gamma_4 z_k(i, j) \quad (17)$$

In this embodiment, the gain term for each of the detectors is expressed as follows:

$$a(i, j) = 1 + \Delta a(i, j) \quad (18)$$

By substituting equations (16)–(18) into equation (11) above, the bias differential for a detector having an arbitrary two-dimensional shift is computed as follows:

$$\Delta(i, j) = \frac{\gamma_1 \Delta a(i-1, j-1) z_k(i-1, j-1) + \gamma_2 \Delta a(i-1, j) z_k(i-1, j) + \gamma_3 \Delta a(i, j-1) z_k(i, j-1)}{(1-\gamma_4)} - \Delta a(i, j) z_k(i, j) + \frac{\gamma_1 b(i-1, j-1) + \gamma_2 b(i-1, j) + \gamma_3 b(i, j-1)}{(1-\gamma_4)} - b(i, j) \quad (19)$$

Therefore, using bias differential in equation (19), the resulting bias estimate is as follows:

$$b^r(i, j) = \Delta(i, j) + \frac{\gamma_1}{(1-\gamma_4)} b^r(i-1, j-1) + \frac{\gamma_2}{(1-\gamma_4)} b^r(i-1, j) + \frac{\gamma_1}{(1-\gamma_4)} b^r(i, j-1) \quad (20)$$

where each $b^r(i, j)$ term is a bias that has been updated during the previous correction cycle. From equation (20), the NUC algorithm 300 recursively computes gain and bias terms for each detector in the focal plane array. In an embodiment, assuming that initial values for gain and bias are $a(i, j)=1$ and $b(i, j)=0$ for all outer perimeter detectors 112, then $\Delta a(i, j)=0$ and $b(i, j)=0$. Thus, the bias differential for the top-leftmost non-calibrated detector is:

$$\Delta(2,2) = -\Delta a(2,2) z_k(2,2) - b(2,2) \quad (21)$$

Then, $$b^r(2,2) = \Delta(2,2) \quad (22)$$

Thus, in general, the bias estimate for the $(i, j)^{th}$ detector is:

$$b^r(i, j) = -\Delta a(i, j) z_k(i, j) - b(i, j) \quad (23)$$

Using the above equations, the multiple bias estimates for each detector are generated for various distinct image pairs. To reduce the effect of error in the bias estimate for each $(i, j)^{th}$ detector, the bias estimates are averaged over time. The bias estimates could also be combined using other conventional methods as would be clear to one with suitable skills in the relevant art. The expected value of the irradiance observed by an $(i, j)^{th}$ detector is defined as follows:

$$\mu_Z(i, j) = \frac{1}{p} \sum_{i=1}^{P} z_m(i, j) \quad (24)$$

wherein p is a total number of distinct image pairs.

Then, the expected value of the quantity in equation (23) is:

$$E\{b^r(i, j)\} = E\{-\Delta a(i, j) z_k(i, j) - b(i, j)\} \quad (25)$$
$$= -E\{\Delta a(i, j) z_k(i, j)\} - E\{b(i, j)\}$$
$$= -\Delta a(i, j) E\{z_k(i, j)\} - b(i, j)$$
$$= -\Delta a(i, j) \mu_Z(i, j) - b(i, j)$$

Thus, the bias estimate in the presence of gain non-uniformity is the true bias value plus the deviation of the gain from one multiplied by the average irradiance observed by the $(i, j)^{th}$ detector. Therefore, the following equation expresses the correction for an $(i, j)^{th}$ detector's output by applying the above correction to equation (15):

$$y_k(i, j) + E\{b^r(i, j)\} = z_k(i, j) + \Delta a(i, j) z_k(i, j) + b(i, j) - \quad (26)$$
$$\Delta a(i, j) \mu_Z(i, j) - b(i, j)$$
$$= z_k(i, j) + \Delta a(i, j)[z_k(i, j) - \mu_Z(i, j)]$$

Then, if true irradiance for each detector in the focal plane array is an average irradiance for an $(i, j)^{th}$ detector plus a deviation from this average irradiance, expressed as:

$$z_k(i, j) = \mu_Z(i, j) + \Delta z_k(i, j) \quad (27)$$

then, equation (26) becomes:

$$y_k(i, j) + E\{b^r(i, j)\} = z_k(i, j) + \Delta a(i, j) \Delta z_k(i, j) \quad (28)$$

Thus, the NUC algorithm substantially corrects gain non-uniformities when the observed irradiance at time k is sufficiently close to an average irradiance value (i.e., in this case, $\Delta z_k(i, j) \approx 0$. Also, if a detector's gain is approximately equal to one, the $\Delta a$ term in the above equations is equal to zero, thus, the corrected detector gain value is approximately equal to the true irradiance value. This embodiment has been already described above with reference to gain term being uniform.

The following description shows application of the NUC algorithm 300 to systems having temperature dependent bias as well as systems having non-uniform gain ($a_{n,S}(i, j) \neq 1$).

4. Correction for Non-Uniform Gain

As mentioned above, the present invention is capable of operating when the gain term in equation (1) is non-uniform (i.e., $a_{n,S}(i, j) \neq 1$). In an alternate embodiment, the NUC algorithm can be generalized to correct for non-uniform gain. The NUC algorithm 300 is generalized to two pairs of readout signals at times m and n, $y_m$, $y_{m+1}$ and $y_n$, $y_{n+1}$ exhibiting vertical shifts, $\alpha_m$ and $\alpha_n$, respectively. If $a(i, j)$ is the gain of the $(i, j)^{th}$ detector, then a ratio of $a(i, j)/a(i+1,j)$ is computed from the detectors' readout signals $y_n(i, j)$, $y_n(i+1,j)$, $y_m(i, j)$, and $y_m(i+1,j)$, as follows:

$$\frac{a(i, j)}{a(i+1, j)} = \frac{\alpha_m \alpha_n [y_m(i, j) - y_n(i, j)]}{\alpha_n [y_{m+1}(i+1, j) - [1-\alpha_m] y_n(i+1, j)] - \alpha_m [y_{n+1}(i+1, j) - [1-\alpha_n] y_m(i+1, j)]} \quad (29)$$

Therefore, when the above quantity is multiplied by the value of $(i+1,j)^{th}$ detector of any raw time frame, the gain associated with the detector is effectively converted from $a(i+1,j)$ to $a(i, j)$. By applying this formula to each detector in FPA 106, each detector's gain becomes uniform. Then, the NUC algorithm 300 applies bias correction to detectors 115 of FPA 106 in the manner described above.

Figure 5A:
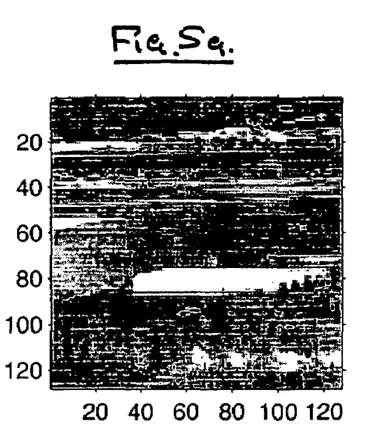
FIG. 5a illustrates an infrared image of a scene generated using a conventional.
Figure 5B:
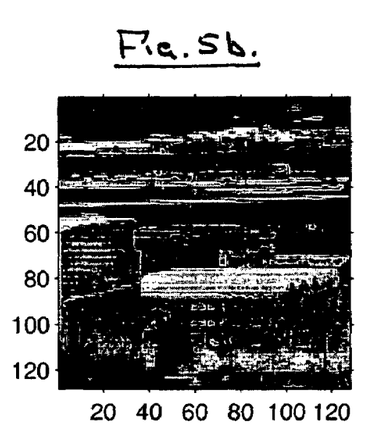
FIG. 5b illustrates a corrected infrared image sequence of the scene in FIG. 5a using a conventional two-point calibration technique.
Figure 5C:
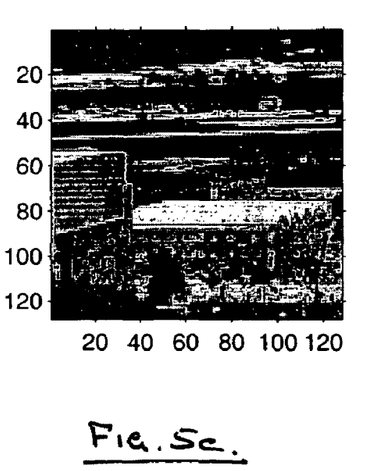
FIG. 5c illustrates a corrected infrared image sequence of the scene in FIG. 5a using the present invention's NUC algorithm.
Figure 5D:
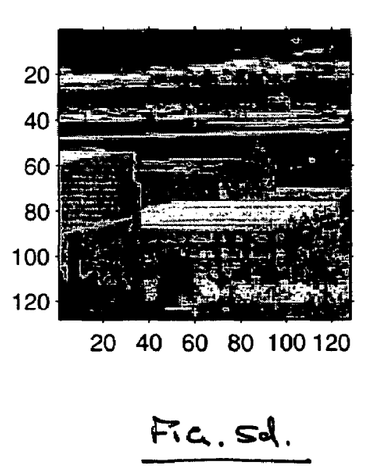
FIG. 5d illustrates a corrected infrared image sequence of the scene in FIG. 5a employing present invention's generalized NUC algorithm.

FIGS. 5a–c illustrate application of NUC algorithm 300 to generate radiometrically accurate images. FIG. 5a illustrates a generated raw infrared (IR) image without application of NUC algorithm 300. FIG. 5b illustrates same IR imagery, as in FIG. 5a, corrected using a conventional two point calibration technique. FIG. 5c illustrates a radiometrically accurate image applying NUC algorithm 300, according to an embodiment of the present invention. The accuracy of the present invention's NUC algorithm is within 0.5% of the conventional technique.

5. Optical System.

Figure 4:
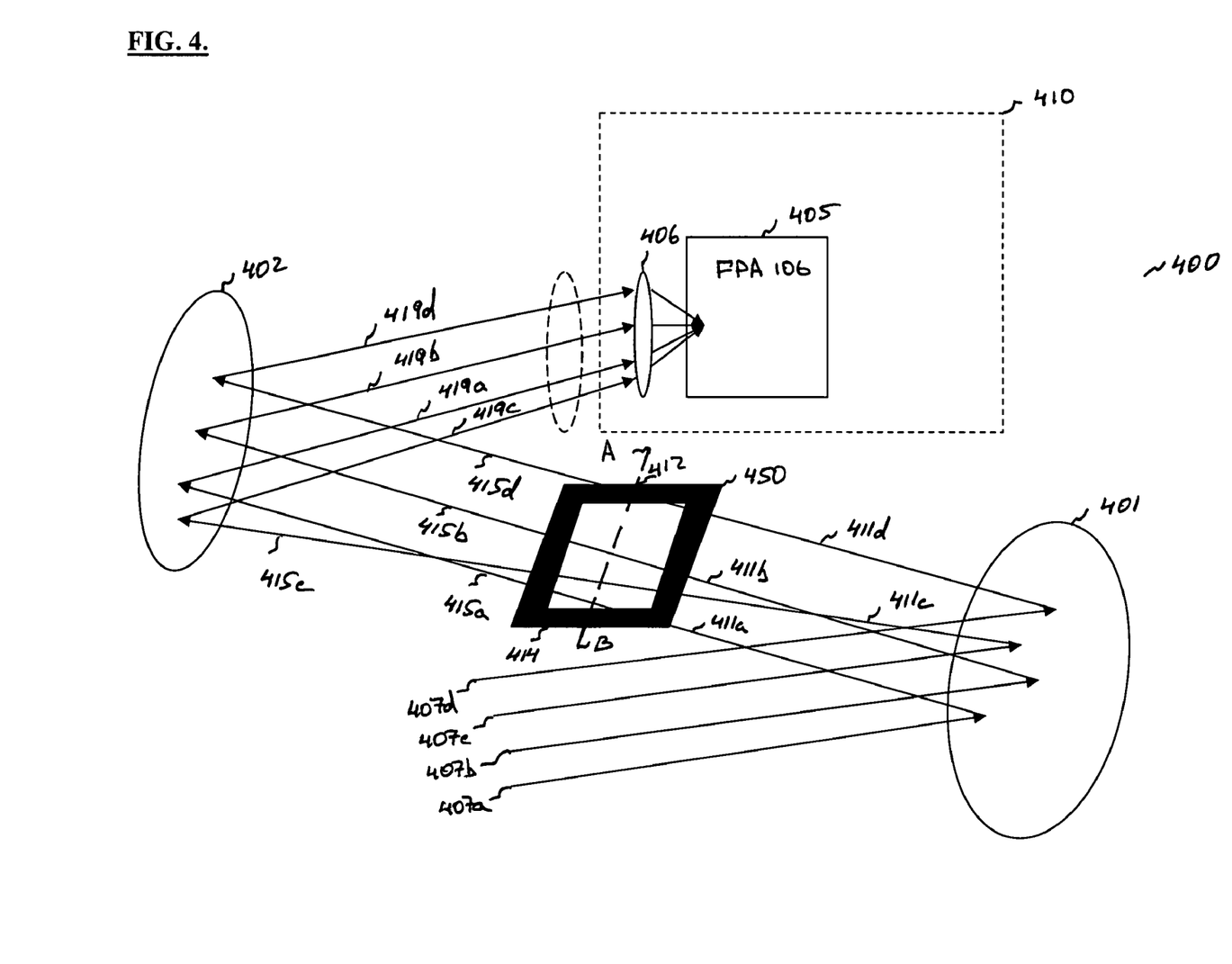
FIG. 4 illustrates an optical system setting that employs the NUC algorithm, according to the present invention.

FIG. 4 illustrates optical system 400 where the NUC algorithm 300 can be implemented to generate corrected image sequence collected by FPA 106, according to an embodiment of the present invention. Optical system 400 includes a first off-axis parabolic mirror 401, a movable field stop ("MFS") 450, a second off-axis parabolic mirror 402, and a camera apparatus 410 that includes FPA 106. MFS 450 is placed along an optical path between the first off-axis parabolic mirror 401 and the second off-axis parabolic mirror 402. The camera apparatus is placed along an optical path of the light reflected from the second off-axis parabolic mirror 402. The camera apparatus 410 further includes FPA 106 (as described in FIG. 1 above).

The MFS 450 translates from position A to position B perpendicular an optical axis (not shown) between first off-axis parabolic mirror 401 and second off-axis parabolic mirror 402. In an alternate embodiment, MFS 450 is stationary and placed in the optical path between the first off-axis parabolic mirror 401 and the second off-axis parabolic mirror 402. It acts as an optical switch re-directing the field of view of the outer perimeter detectors 112 (not shown).

Scene light 407 is incident on the first off-axis parabolic mirror 401. The first off-axis parabolic mirror 401 reflects scene light 407 as a reflected scene light 411. The scene light 407 includes four light ray bundles 407a, 407b, 407c, and 407d. Within each light ray bundle 407(a, b, c, d), each ray is traveling parallel to each other.

The reflected scene light 411 is reflected in a different direction as compared to scene light 407, because of the properties of the off-axis parabolic mirror 401. Each light ray bundle 407a, 407b, 407c, and 407d of scene light 407 is reflected by the first off-axis parabolic mirror 401 as respective reflected light ray bundles 411a, 411b, 411c, and 411d of reflected scene light 411. These bundles are focused at the four points of the MFS 450. MFS 450 passes reflected scene light 411 at some points on MFS 450 and serves as a blackbody for reflected scene light 411 at other points on MFS 450.

The reflected scene light 411 then passes through the MFS 450. In an embodiment, reflected scene light ray bundles 411b and 411c are able to pass through the interior portion 412 of MFS 450. However, MFS 450 does not allow reflected light ray bundles 411a and 411d to pass through its outer portion 414 when MFS 450 is in position A. MFS 450 position A corresponds to the optical switch 120 "on" position 121 (not shown). On the other hand, MFS 450 position B corresponds to the optical switch 120 "off" position 122 (not shown). When MFS 405 is in position B, all reflected light ray bundles 411(a, b, c, d) are able to pass through towards second off-axis mirror 402. In an embodiment, MFS 450 is a temperature controlled black body and acts as the calibration source 102 (not shown).

After passing through MFS 450, reflected scene light 411 becomes image light 415 having corresponding light ray bundles 415a, 415b, 415c, and 415d. The image light 415 travels towards the second off-axis parabolic mirror 402. The second off-axis parabolic mirror 402 then reflects the image light 415 towards the camera apparatus 410 in a form of reflected image light 419. The reflected image light 419 includes four light ray bundles 419a, 419b, 419c, and 419d corresponding to the original scene light ray bundles 407a, 407b, 407c, and 407d. Similarly to scene light 407, reflected image light ray bundles 419(a, b, c, d) are parallel to each other. The reflected image light 419 is then directed towards camera apparatus 410. The camera apparatus 410 will generate a corrected image sequence.

The camera apparatus 410 includes a receiving aperture 406 and an imaging apparatus 405. The imaging apparatus 405 re-images the reflected light 419 onto the FPA 106 and corrects for any optical distortion introduced by the off-axis parabolic mirrors 401 and 402. The image generated by the camera apparatus 410 is substantially identical to the original scene for all detectors 115, when the optical switch 120 is in the "off" position (or during the operation of the scene cycle of the NUC algorithm). When the optical switch 120 is in the "on" position (or during operation of the calibration cycle ) not all detectors 115 are viewing the scene. In particular, the outer perimeter detectors 112 (not shown) have their field of view directed towards the calibration source 102 and the inner detectors 116 (not shown) and buffer detectors 114 (not shown) have their field of view directed to substantially identical image of the original scene. As can be understood by one having ordinary skill in the relevant art, other embodiments of the camera apparatus 410 are possible.

6. Conclusion.

Example embodiments of the methods, circuits, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed:

1. A method of generating an image sequence, comprising the steps of:
    calibrating a first subset of detectors in a focal plane array using a calibration source, the focal plane array having a second subset of detectors;
    detecting scene irradiance using the detectors in the focal plane array;
    generating an output image sequence for each of the detectors based on the detected irradiance;
    correcting the output image sequence generated by the first subset of detectors in the focal plane array and correcting the output image sequence generated by the second subset of
    detectors in the focal plane array using the correction provided to the first subset of detectors.

2. The method of claim 1, further comprising the step of generating a corrected output image sequence based on the correction provided to the detectors in the focal plane array.

3. The method of claim 1, wherein calibrating a first subset of detectors includes redirecting a view of field of the first subset to the calibration source from a scene providing the scene irradiance.

4. The method of claim 1, wherein calibrating a first subset of detectors includes calibrating the first subset of detectors using a blackbody source, wherein the blackbody source is defined by a blackbody density function.

5. A method of generating an image sequence, comprising the steps of:
    detecting scene irradiance using detectors in a focal plane array;

generating an output image sequence for each of the detectors based on the detected irradiance;
correcting the output image sequence generated by a first subset of detectors in the focal plane array and the output image sequence generated by a second subset of detectors in the focal plane array using the correction provided to the first subset of detectors, wherein said step of correcting further comprises the step of calibrating detectors in the first subset of detectors using a calibration source, wherein said calibrating step further comprises the steps of:
generating a gain and a bias for each detector in the first subset of detector; and
adjusting each detector's gain to one and each detector's bias to zero in the first subset of the detectors.

6. A method of generating an image sequence, comprising the steps of:
detecting scene irradiance using detectors in a focal plane array;
generating an output image sequence for each of the detectors based on the detected irradiance;
correcting the output image sequence generated by a first subset of detectors in the focal plane array and the output image sequence generated by a second subset of detectors in the focal plane array using the correction provided to the first subset of detectors, wherein said step of correcting further comprises the step of calibrating detectors in the first subset of detectors using a calibration source, wherein said calibrating step further comprises the steps of:
generating a gain and a bias for each detector in the first subset of detectors; and
adjusting each detector's gain to one and each detector's bias to a defined value in the first subset of detectors.

7. The method of claim 5, wherein said adjusting step further comprises the step of adjusting biases of each detector in the second subset of detectors to zero.

8. The method of claim 6, wherein said adjusting step further comprises the step of adjusting biases of each detector in the second subset of detectors to the defined value.

9. A method of generating an image sequence, comprising the steps of:
detecting scene irradiance using detectors in a focal plane array;
generating an output image sequence for each of the detectors based on the detected irradiance;
correcting the output image sequence generated by a first subset of detectors in the focal plane array and the output image sequence generated by a second subset of detectors in the focal plane array using the correction provided to the first subset of detectors, wherein said step of correcting further comprises the step of calibrating detectors in the first subset of detectors using a calibration source, wherein said calibrating step further comprises the steps of:
generating a gain and a bias for each detector in the first subset of detectors; and
adjusting each detector's gain to a preset value and each detector's bias to zero in the first subset of detectors.

10. A method of generating an image sequence, comprising the steps of:
detecting scene irradiance using detectors in a focal plane array;
generating an output image sequence for each of the detectors based on the detected irradiance;
correcting the output image sequence generated by a first subset of detectors in the focal plane array and the output image sequence generated by a second subset of detectors in the focal plane array using the correction provided to the first subset of detectors, wherein said step of correcting further comprises the step of calibrating detectors in the first subset of detectors using a calibration source, wherein said calibrating step further comprises the steps of:
generating a gain and a bias for each detector in the first subset of detectors; and
adjusting each detector's gain to a preset value and each detector's bias to a defined value in the first subset of detectors.

11. The method of claim 9, wherein said adjusting step further comprises the step of adjusting biases of each detector in the second subset of detectors to zero.

12. The method of claim 10, wherein said adjusting step further comprises the step of adjusting biases of each detector in the second subset of detectors to the defined value.

13. A method of generating an image, comprising the steps of:
calibrating at least one first detector to generate calibration information using a calibration source; and
generating an image using at least one second detector, wherein the generated image is altered as a function of the calibration information.

14. The method of claim 13, wherein said calibrating step further comprises
calibrating the at least one first detector using a blackbody source, wherein the blackbody source is defined by a blackbody density function.

15. The method of claim 13, wherein said calibrating step further comprises the steps of:
generating a gain and a bias for the at least one first detector; and
adjusting the least one first detector's gain to one and the least one first detector's bias to zero.

16. The method of claim 13, wherein said calibrating step further comprises the steps of:
generating a gain and a bias for the at least one first detector; and
adjusting the at least one first detector's gain to one and the at least one first detector's bias to a defined value.

17. The method of claim 15, wherein said adjusting step further comprises the step of adjusting biases of the at least one second detector to zero.

18. The method of claim 16, wherein said adjusting step further comprises the step of adjusting biases of the at least one second detector to the defined value.

19. The method of claim 13, wherein said calibrating step further comprises the steps of:
generating a gain and a bias for the at least one first detector; and
adjusting the at least one first detector's gain to a preset value and the at least one first detector's bias to zero.

20. The method of claim 13, wherein said calibrating step further comprises the steps of:
generating a gain and a bias for the at least one first detector; and
adjusting the at least one first detector's gain to a preset value and the at least one first detector's bias to a defined value.

21. The method of claim 19, wherein said adjusting step further comprises the step of adjusting biases of the at least one second detector to zero.

22. The method of claim 20, wherein said adjusting step further comprises the step of adjusting biases of the at least one second detector to the defined value.

23. A method of generating an image, comprising the steps of:
 calibrating at least one first detector to generate calibration information and
 generating an image using at least one second detector, wherein the generated image is altered as a function of the calibration information, wherein said generating step further comprises generating using the at least one second detector a readout signal $Y_n(i, j)$ wherein $$y_n(i, j) = a_{n,s}(i, j) z_n(i, j) = b_n(i, j)$$

where $a_{n,s}(i, j)$ is a gain and $b_n(i, j)$ is a bias of the at least one second detector having coordinates i and j generating an image at a specific time n; $z_n(i, j)$ is a total average number of photons impinging on the at least on second detector at the time n.

24. The method of claim 23, wherein said generating step further comprises computing a bias correction for the readout signal of the at least one second detector.

25. The method of claim 24, wherein said computing step further comprises adjusting the readout signal of the at least one second detector using the computed bias correction.

26. The method of claim 25, wherein said adjusting step further comprises setting the bias of the at least one second detector so that $b_n(i, j) = 0$.

27. The method of claim 25, wherein said adjusting step further comprises setting the bias of the at least one second detector so that $b_n(i, j) = b$, wherein b is a defined value.

28. A method for generating an image using a focal plane array having a plurality of outer detectors and a plurality of inner detectors, comprising the steps of:
 calibrating the plurality of outer detectors using a calibration source to calculate calibration information for the inner detectors;
 generating an image using the inner detectors;
 wherein said generating further comprises each inner detector generating a readout signal, $y_n(i, j)$, as follows:

$$y_n(i, j) = a_{n,s}(i, j) z_n(i, j) + b_n(i, j)$$

where $a_{n,s}(i, j)$ and $b_n(i, j)$ are gain and bias for each inner detector having coordinates i and j with the readout signal measured at time n; $z_n(i, j)$ is a total average number of photons impinging on each inner detector at time n;

computing a bias correction for each inner detector using the calculated calibration information; and
 altering the inner detectors generated image using computed bias correction.

29. The method of claim 28, wherein said calibrating step further comprises setting bias of the outer perimeter detectors to zero.

30. The method of claim 28, wherein said calibrating step further comprises setting bias of the outer perimeter detectors to a defined value.

31. An optical apparatus for generating an image, comprising:
 an imaging system having a plurality of detectors including at least one first detector and at least one second detector;
 a first off-axis parabolic mirror placed in an optical path of said imaging system;
 a second off-axis parabolic mirror; and
 a movable field stop, wherein said movable field stop is placed in an optical path between said first and said second off-axis parabolic mirror;
 wherein said imaging system passes light through said first off-axis parabolic mirror, said second off-axis parabolic mirror, and said movable field stop, and
 wherein said imaging system calibrates at least one first detector to generate a calibration information and generates an image with at least one second detector, wherein the generated image is altered as a function of the calibration information.

32. The optical apparatus of claim 31, wherein a light incident on said first off-axis parabolic mirror is reflected towards said second off-axis parabolic mirror via said movable field stop.

33. The optical apparatus of claim 32, wherein said movable field stop directs said reflected light towards said second off-axis parabolic mirror, which then reflects said reflected light towards said imaging system plurality of detectors.

34. The optical apparatus of claim 31, further comprising a calibration source.

35. The optical apparatus of claim 34, wherein said calibration source is a blackbody source, wherein the blackbody source is defined by a blackbody density function.

* * * * *

UNITED STATES PATENT AND TRADEMARK OFFICE
CERTIFICATE OF CORRECTION

PATENT NO. : 7,132,648 B2 Page 1 of 1
APPLICATION NO. : 10/824285
DATED : November 7, 2006
INVENTOR(S) : Ratliff et al.

It is certified that error appears in the above-identified patent and that said Letters Patent is hereby corrected as shown below:

On the Title page, in item (54), in "Title", in column 1, line 3, after "OF" delete "INFRARED".

On the Title page, in item (75), in "Inventors", in column 1, line 1, delete "Ratiff" and insert -- Ratliff --, therefor.

Column 1, line 3, after "OF" delete "INFRARED".

Column 19, line 7, in Claim 23, after "information" insert -- ; --.

Column 19, line 12, in Claim 23, after "$Y_n(i, j)$" insert -- , --.

Column 19, line 18, in Claim 23, delete "on" and insert -- one --, therefor.

Signed and Sealed this

Sixteenth Day of January, 2007

JON W. DUDAS
*Director of the United States Patent and Trademark Office*